United States Patent
Bao et al.

(10) Patent No.: US 6,241,397 B1
(45) Date of Patent: Jun. 5, 2001

(54) CASCADED FIXED AND TUNABLE MULTIPLE-FIBER FABRY PEROT FILTERS AND FIXED AND TUNABLE FERRULE ALIGNMENT FIXTURES FOR FIBER FABRY PEROT FILTERS

(75) Inventors: Yufei Bao; Kevin Hsu, both of Roswell, GA (US); Thomas Q. Y. Li, San Jose, CA (US); Calvin M. Miller, Naples, FL (US); Jeffrey W. Miller, Kennesaw, GA (US)

(73) Assignee: Micron Optics, Inc., Atlanta, GA (US)

( * ) Notice: Subject to any disclaimer, the term of this patent is extended or adjusted under 35 U.S.C. 154(b) by 0 days.

(21) Appl. No.: 09/293,324

(22) Filed: Apr. 16, 1999

Related U.S. Application Data
(60) Provisional application No. 60/082,139, filed on Apr. 17, 1998.

(51) Int. Cl.[7] .................................................. G02B 6/38
(52) U.S. Cl. ................................ 385/73; 385/72; 385/66; 372/20
(58) Field of Search .......................... 385/73, 72, 16, 385/70, 59, 81, 66, 25, 52; 372/20

(56) References Cited

U.S. PATENT DOCUMENTS

| | | | |
|---|---|---|---|
| 5,212,745 | 5/1993 | Miller | 385/25 |
| 5,212,746 | 5/1993 | Miller et al. | 385/25 |
| 5,289,552 | 2/1994 | Miller et al. | 385/73 |
| 5,375,181 | 12/1994 | Miller et al. | 385/27 |
| 5,422,970 | 6/1995 | Miller et al. | 385/72 |
| 5,425,039 | 6/1995 | Hsu et al. | 372/6 |
| 5,509,093 | 4/1996 | Miller et al. | 385/27 |
| 5,563,973 | * 10/1996 | Miller et al. | 385/81 |
| 5,838,437 | 11/1998 | Miller et al. | 356/345 |
| 5,892,582 | 4/1999 | Bao et al. | 356/345 |

* cited by examiner

*Primary Examiner*—Phan T. H. Palmer
(74) *Attorney, Agent, or Firm*—Greenlee, Winner and Sullivan, P.C.

(57) ABSTRACT

The invention provides cascaded Fabry-Perot filters having a plurality of optical fibers within a single F-P cavity. Of particular interest are cascaded FFPs having two, three or four optical fiber paths in the filter. An all-fiber FFP filter has a ferrule assembly having two or more aligned fiber ferrules, each having a plurality of optical fibers bonded into axial bores. Mirrors within the ferrule assembly transverse to the fibers from the F-P cavity. The FP filters can be fixed wavelength or tunable by changing an air gap within the cavity. The invention also provides ferrule holders useful for maintaining alignment of and for tuning the air gap of ferrule assemblies. The holders are particularly useful for construction of cascaded F-P filters.

28 Claims, 15 Drawing Sheets

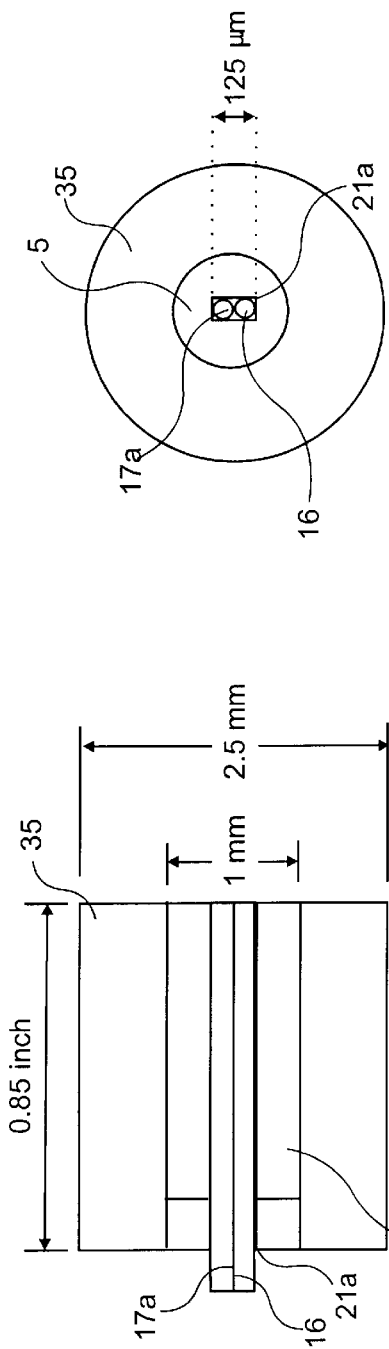
FIG. 3A
FIG. 3B
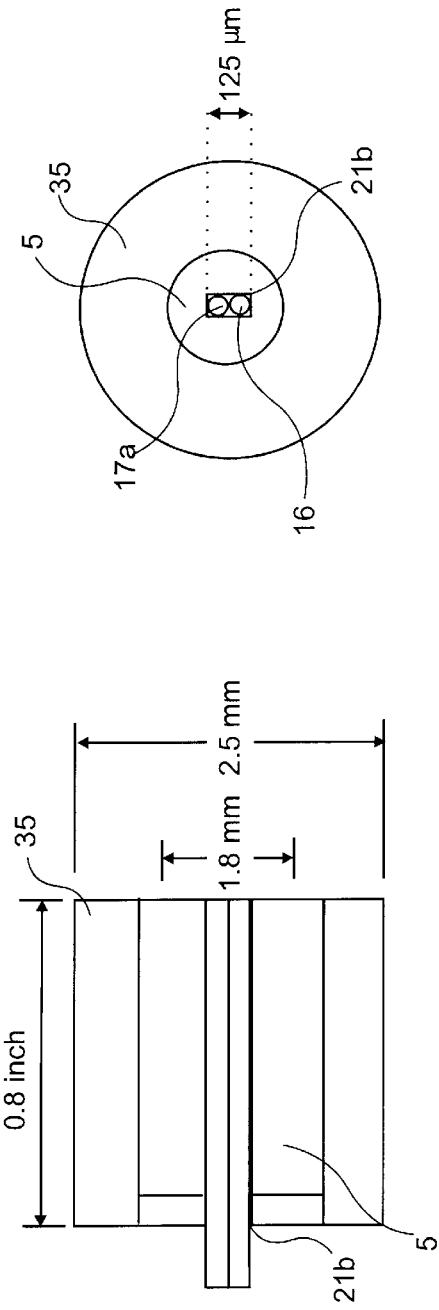
FIG. 3C
FIG. 3D

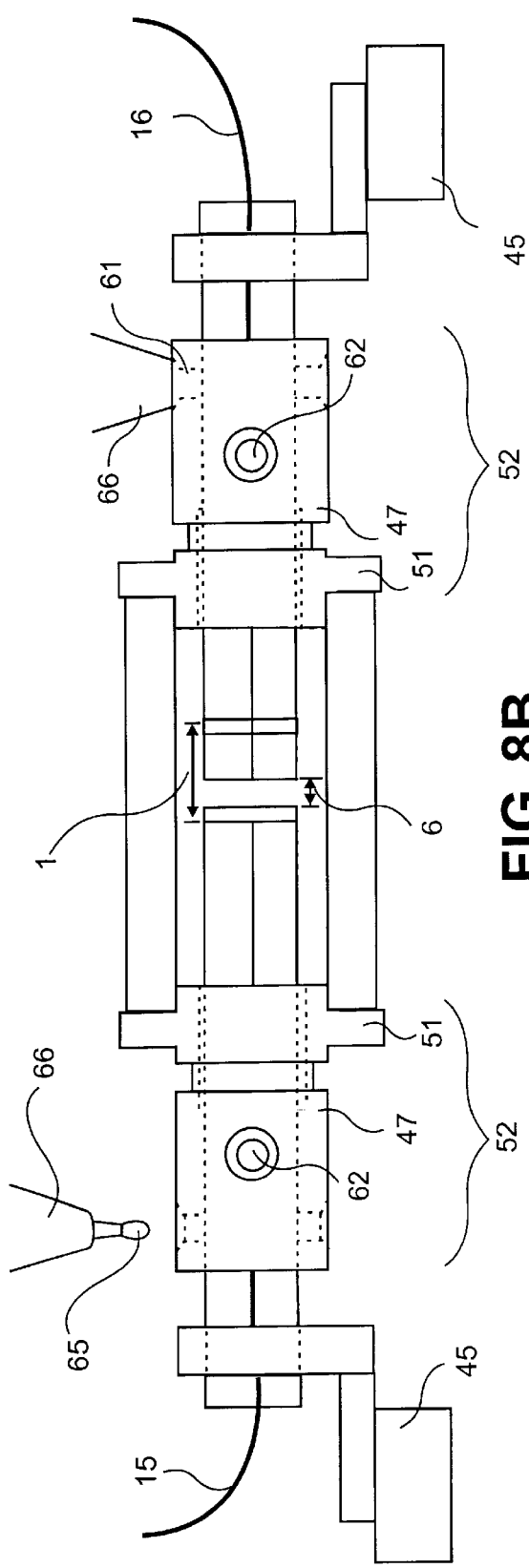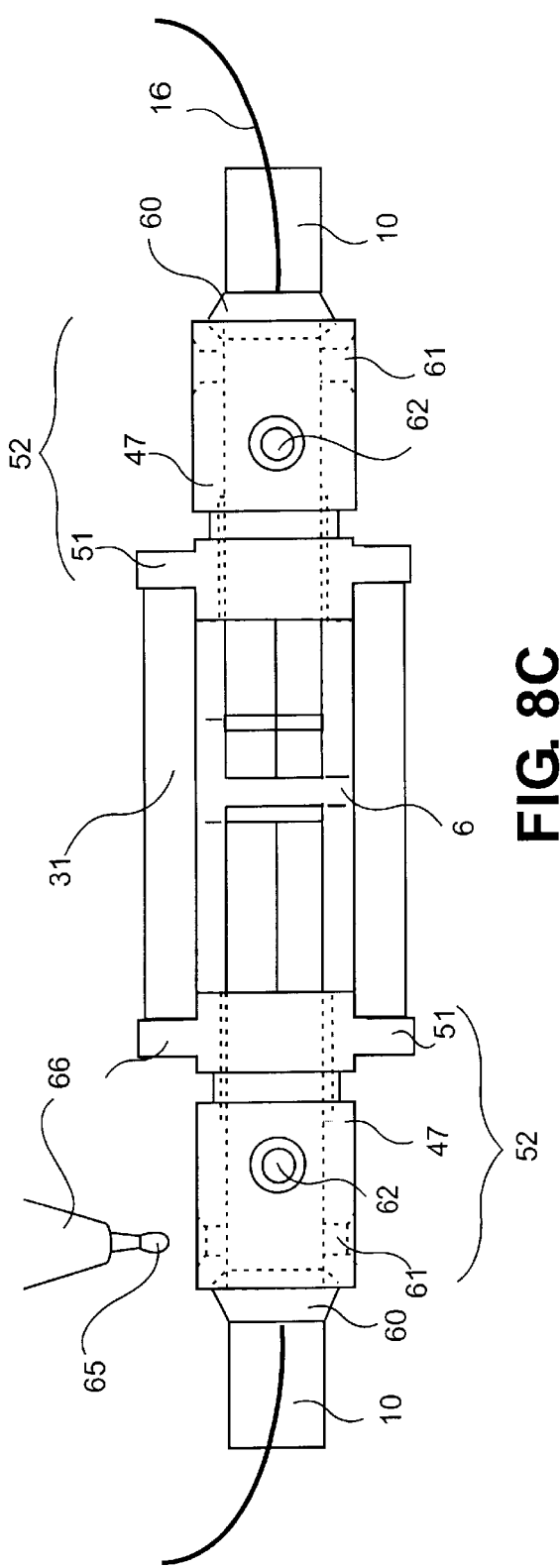

CASCADED FIXED AND TUNABLE MULTIPLE-FIBER FABRY PEROT FILTERS AND FIXED AND TUNABLE FERRULE ALIGNMENT FIXTURES FOR FIBER FABRY PEROT FILTERS

CROSS-REFERENCE TO RELATED APPLICATIONS

This application takes priority under 35 U.S.C. 119(e) from U.S. provisional application 60/082,139, filed Apr. 17, 1998, which is incorporated by reference in its entirety.

This invention relates to fiber Fabry Perot filters (FFPs) for use in various optical and communication applications.

BACKGROUND OF THE INVENTION

Fixed wavelength and tunable wavelength all-fiber Fabry Perot filters have been described in several U.S. patent applications including U.S. Pat. Nos. 5,212,746; 5,289,552; 5,212,745; 5,375,181; 5,422,970; 5,509,093; and 5,563,973. These patents provide descriptions of the manufacture of ferrule assemblies containing axial optical fibers as components of FFP filters comprising mirror-ended ferrules and embedded- mirror wafered ferrules. These patents also describe methods of making the mirror-ended ferrules and embedded-mirror wafered ferrules, methods of aligning the fibers of the ferrules to form an Fabry Perot optical cavity filter and ferrule alignment fixtures for use with such aligned ferrule assemblies. Alignment fixtures which facilitate alignment of fixed wavelength FFPs are described as well as alignment fixtures that facilitate wavelength tuning of the optical cavity of the filter without significant detriment to fiber alignment. Methods and alignment fixtures useful for passive and active temperature compensation and small range temperature tuning (or trimming) of fixed FFPs are also described in these patents.

U.S. patents and pending U.S. patent applications: 5,425,039; U.S. Pat. Ser. No. 08/984,245; now U.S. Pat. No. 6,044,189; U.S. Pat. Ser. No. 08/897,474; U.S. Pat. No. 5,892,582; U.S. Pat. Ser. No. 08/805,461; U.S. Pat. Ser. No. 08/833,602 U.S. Pat. No. 5,583,437; U.S. Pat. Ser. No. 60/028,517; U.S. Pat. Ser. No. 60/031,562; and U.S. Pat. Ser. No. 60/058,090 describe methods of using fixed and tunable FFP filters in wavelength scanners, wavelength references, spectrum analyzers and in optical fiber lasers. These patents are incorporated in their entirety by reference herein to the extent not inconsistent herewith.

For signal detection in dense WDM (50 GHz signal separation) applications using a filter with single path construction, a filter with a bandwidth of 0.02 nm (a finesse of 3000 for an FSR of 60 nm) is required. Filter requirements are less stringent if two filters cascaded in series are employed. In this case, a filter having a bandwidth of 0.12 nm (a finesse of 500 for an FSR of 60 nm) is required. The use of two or more filters in series would provide significant advantages for obtaining required signal resolution employing filters which have less stringent optical requirements and as such are less expensive and easier to manufacture. Such filters are also more reliably manufactured. However, cascading of filters in series generates other difficulties, particularly when the filters are wavelength tuned during operation, since tuning of the separate filters must be coordinated.

All-fiber Fabry Perot filters are very attractive candidates for high resolution, high finesse applications. Significant cost and efficiency of manufacture benefits could be achieved by the use of cascaded FFP configurations. This application provides cascaded multiple fiber FP filters with significantly improved properties for high resolution and high finesse application. This application also provides alignment fixtures for use generally in any FFP filter that are easy to manufacture and less expensive to manufacture then current alignment fixtures. The fixtures disclosed herein are more particularly useful in tunable cascaded multiple fiber FFPS.

Current alignment fixtures for FFP can used end-brackets made of Kovar /stainless steel that require the use of ED machining which are relatively costly parts. The use of these precision end-brackets does not require any additional precision alignment equipment; however, several minutes to an hour may be required to adjust alignment of the FFP using such fixtures. Further, environmental testing (temperature cycling) usually yields only a 50% passage rate of FFPs. No angular adjustments can be made during assembly with such fixtures and small end-angle perpendicularity problems cannot be adjusted out. Loss performance of filters may be effected by the alignment techniques used with these end-bracket fixtures. This invention provides an external alignment technique (using an alignment stage) and relatively low cost alignment fixtures that can lock and maintain the ferrule alignment obtained using the alignment stage.

All references cited in this application are incorporated in their entirety herein to the extent that their teaching are not inconsistent with those of the present application.

SUMMARY OF THE INVENTION

This invention provides cascaded all fiber Fabry-Perot filters (FFPs). These cascaded filters physically have a single Fabry Perot optical cavity, but generate a cascaded series of FFPs by use of a series of multiple loops of optical fiber whose optical path passes through the single FP cavity multiple times. The FFP filters of this invention are constructed using fiber ferrule assemblies to form the optical cavity. An all-fiber FP is, for example formed by aligning the fiber of a mirror-ended fiber ferrule with the fiber of an embedded-mirror wafered ferrule to maximize optical signal through the aligned fibers. The ferrules of the ferrule assembly have an axial bore into which optical fiber is bonded. An optical fiber end is positioned at one end face (at least) of each ferrule in the assembly. The opposed mirrors within the ferrule assembly form the FP cavity, the optical path of the fiber passes through the cavity and the cavity is tunable by changing the distance (i.e., the air gap) between the end faces of the ferrules. Cascaded FFPs of this invention are formed by use of ferrule assemblies which contain multiple aligned fibers which are optically coupled to form a continuous optical path which passes through the FP cavity multiple times. These configurations allow construction of a series of cascaded FFPs all of which have an identical optical cavity and all of which can be simultaneously tuned by changing the filter air gap.

The cascaded FFPs can be fixed wavelength or tunable filters. In fixed wavelength filters, the distance between the mirrors (i.e., cavity length) is held fixed, either the air gap is held fixed or the internal ends of the ferrules of the ferrule assembly are bonded together after alignment.

The cascaded FFPs of this invention can be constructed having two, three, four or more fibers in the axial bores of the ferrules of the ferrule assembly. Those with two fibers can be used to form a dual cascaded filter. Those with three fibers can be used to form a triple cascaded filter and those with four fibers can be used to form a quadruple cascaded filter. Ferrule assemblies are aligned so that the filters are tunable over a useful range, for example, dual fiber cascaded FFPs have been prepared that are tunable over a 50 nm range.

An important aspect of this invention is the discovery that the use of index matching fluid in the air gap between the end faces of the ferrules or alternatively and preferably the use of an anti-reflection (AR) coating at the wafer end face in the multiple fiber ferrule assemblies greatly expands the wavelength tuning range of the cascaded FFP.

Cascaded multiple fiber FFPs of this invention can employ a variety of ferrule materials (glass, PYREX (Trademark), ceramic or metal) and can employ any of a variety of single mode optical fibers.

This invention also provides ferrule alignment fixtures for holding the aligned ferrule assemblies of this invention to maintain alignment and to allow for fixed wavelength or tunable wavelength operation of the FFPs. Preferred tunable FFPs employ piezoelectric transducer (PZT) elements the length of which can be changed by application of an appropriate voltage to change the optical cavity length by changing the air gap between the ferrules. Ferrule assemblies are aligned using a ferrule alignment stage, preferably an alignment stage with v-grooves for holding the ferrules and which can be adjusted in 6 dimensions (x, y and z (where z is the distance between the ferrules) and by three angles). Commercially available alignment stages can be employed. A preferred method for construction of an FFP using the inventive alignment fixture is to first align the ferrule assembly, insert the ferrules into the passageway of the fixture and return the ferrule ends to the alignment stage. The z distance between the ferrule faces is first set and then the fibers within the ferrules are aligned to maximized desired optical signal through the ferrule assembly. The aligned ferrules are then bonded into the alignment fixture preferably using a UV cured epoxy.

This invention thus provides an external alignment technique (using an alignment stage) in combination with relatively low-cost alignment fixtures that locks and maintains the ferrule alignment obtained using the alignment stage. The method can be employed to manufacture any type of all fiber FP.

BRIEF DESCRIPTION OF THE FIGURES

FIGS. 3A–3G schematically illustrate ferrule structures for multiple fiber-containing ferrules. The figures illustrate ferrules with varying shapes (e.g., oval, rectangular, round, square, or triangular) of axial bore, varying numbers of fibers in the bore (2–4)(FIGS. 3B,3D, 3E–3G), and ferrules with different outside diameters (FIGS. 3A and 3C). Exemplary dimensions are provided in FIGS. 3A–3D.

FIGS. 8A–8D illustrates, using cross-sectional views, the alignment process for construction of the tunable FFP filter of FIG. 7. FIG. 8A illustrates the alignment and bonding of the metal ferrule attachment rings to the cylindrical PZT. A metal alignment rod is inserted through the passageway of the fixture to facilitate alignment of the metal rings with the PZT. FIG. 8B illustrates insertion of the ferrules of the ferrule assembly in either end of the fixture. The optical fibers of the ferrules are aligned externally by supporting the ferrule ends in the v-grooves of an alignment stage (six dimensional alignment is preferred) and adjusting the stage dimensions to maximize desired optical signal output. Solder is introduced into holes positioned in the metal ferrule attachment ring to bond the aligned ferrules to the fixture to maintain alignment. After the solder bonds are formed the FFP (ferrule assembly and fixture) can be removed from the alignment stage. FIG. 8C illustrates subsequent sealing of the ferrule body to the metal ring with a solder seal around the circumference of the ferrules. FIG. 8D illustrates a method for adjusting alignment of the fibers of the ferrule assembly after the ferrules are bonded to the fixture.

In FIG. 10 (-♦-) A is 0.955, R2 is 0.005%; (-○-) A is 0.925, R2 is 0.17%; is A= 1. R2 is 0; (-■-) is A = 0.685, R2 is 4%; (-+-) A is 1 and R2 is 4%; and (-Δ-) A is 0.93 and R2 is 0.17%.

DETAILED DESCRIPTION OF THE INVENTION

This invention is further described by reference to the Figures in which the same reference numbers are used to indicate the same elements.

Figure 1:
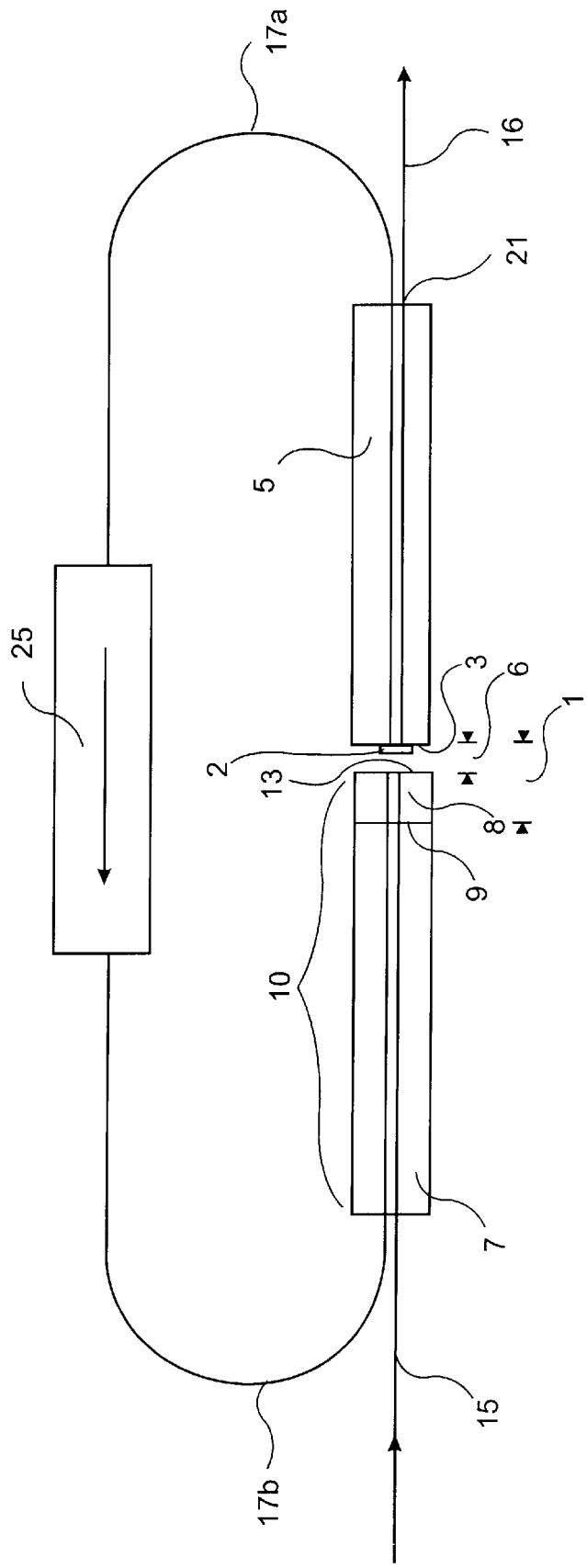
FIG. 1 schematically illustrates a dual (two) fiber cascaded FFP filter ferrule assembly. Each ferrule accommodates two strands of optical fiber. The assembly can be employed in either fixed filter or tunable-filter configurations.

FIG. 1 illustrates a dual-fiber ferrule assembly for a cascaded FFP. The assembly illustrated has two ferrules. Ferrule 5 is a mirror-ended ferrule and ferrule 10 is an embedded-mirror wafered ferrule.

Figure 3E:
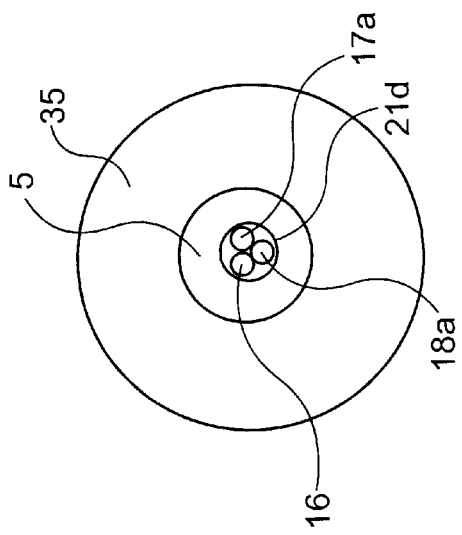
Figure 3G:
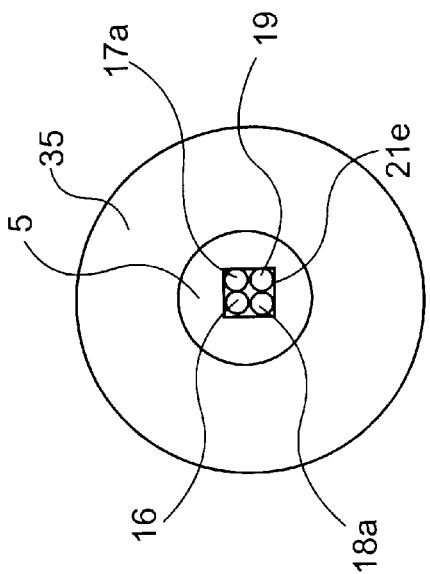
Figure 3F:
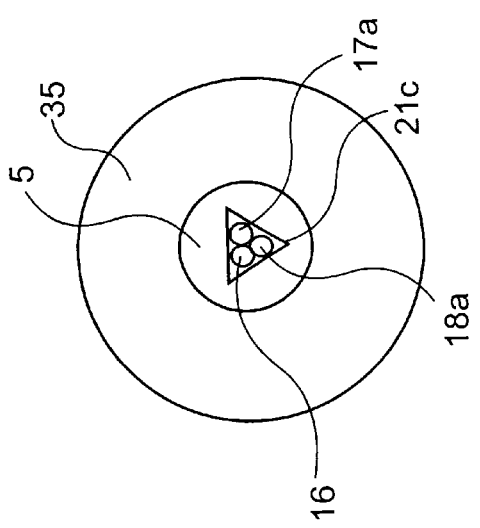

Ferrule 5 is a cylindrical element, most often made of PYREX™ glass, having an axial bore in which optical fiber is bonded. In this case, the ferrule has an oval shaped axial bore (21, see FIG. 3D) and two optical fibers (16 and 17A) are bonded into the bore of ferrule 5. An end of each of the optical fibers is at the internal end (3) of the ferrule which is polished to be perpendicular to the ferrule axis. Since deviations from perpendicularity can effect fiber alignment, the tolerance for polishing of ferrule end faces is preferably 0.03%. Mirror 2 is typically a dielectric mirror deposited over the central portion of the ferrule covering the axial bore end and covering the fiber ends. The mirror is substantially transverse to the bore and the fibers in the bore.

Ferrule 10 has two portions a ferrule portion 7 analogous to ferrule 5 with an axial bore (illustrated as an oval bore) containing two fibers and a wafer portion 4 also having an oval axial bore and two fibers. The wafered ferrule is prepared from a mirror-ended ferrule (like 5) and a simple ferrule with no mirror (like 5 with no mirror). The internal end faces of the ferrule are opposed and the ferrules are oriented with respect to each to individual align the fibers to maximize optical signal through the two ferrules. The aligned ferrules are bonded together maintaining the alignment. One ferrule is then cut and polished to form a wafer 8 of desired length. This process forms a wafered ferrule with a mirror ( 9) (an embedded mirror) between the ferrule (7) and the wafer (8) and with two separate fiber paths (15 and 17B) there through. Again the internal end face of the wafered ferrule (13, i.e the internal end face of the wafer) has two fiber ends and is polished to be perpendicular to the ferrule axis.

In the ferrule assembly, the end faces 3 and 13 of ferrules 5 and 10 are opposed and spaced apart to form air gap 6. The fibers in the ferrules are aligned (as will be discussed in more detail below) to maximized desired optical signal through the assembly. As illustrated, fiber 15 is aligned with fiber 17A and fiber 17B is aligned with fiber 16. In an FFP filter the aligned ferrule assembly is held in an alignment fixture that maintains the alignment. An optical cavity 1 is formed in the ferrule assembly between the mirrors. The optical cavity length can be changed by changing the length of the air gap, i.e. by tuning the air gap, by changing the distance between the ferrule end faces.

The external ends of fibers 17A and 17B are optically connected via fusion splices, for example, through an optical isolator 25 to form a unidirectional optical path loop. This loop provides for a second passage of input light through the FP cavity and results in the formation of a cascaded FFP filter. In the illustrated configuration light is input to the filter via optical fiber 15, passed through the 17A/17B loop (making a second pass through the FFP cavity) and exits through fiber 16.

Figure 2:
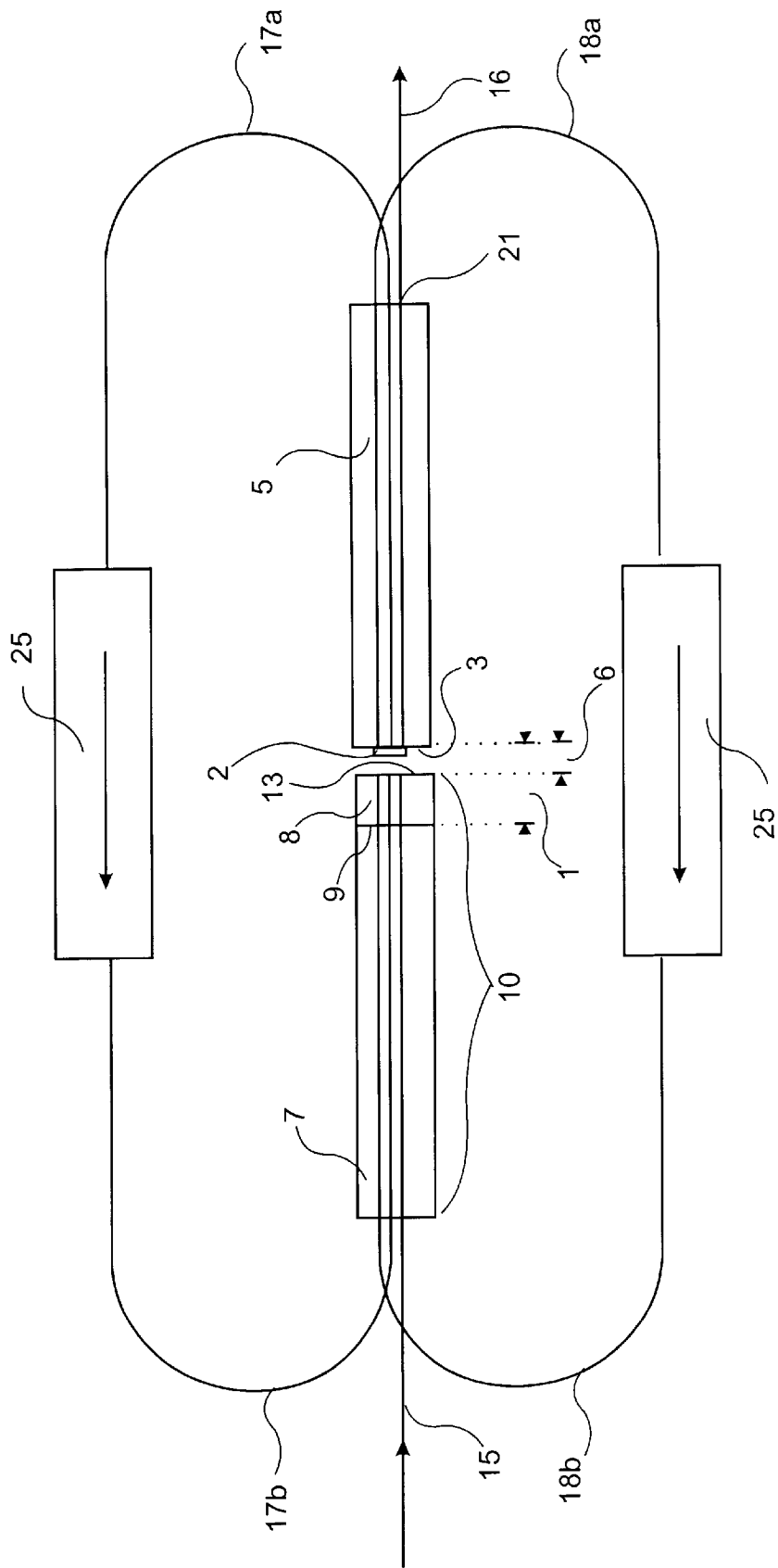
FIG. 2 schematically illustrates a multiple fiber cascaded FFP filter ferrule assembly. In the assembly illustrated, each ferrule accommodates three strands of optical fiber.

FIG. 2 illustrates a three fiber ferrule assembly similar to that of FIG. 1 except that each ferrule contains three fibers in the axial bore. In this case, fiber 15 is aligned with fiber 17A, fiber 17B is aligned with fiber 18A, and fiber 18B is aligned with fiber 16. The external ends of fibers 17A and 17B are spliced through an isolator (25) and the external ends of fibers 18A and 18B are spliced through an isolator (25) forming two unidirectional optical path loops. These loops provide for a second and third passage of input light through the FP cavity and result in the formation of a cascaded FFP filter. In the illustrated configuration, light is input to the filter via optical fiber 15, passed through the 17A/17B loop (making a second pass through the FFP cavity), then passed through the 18A/18B loop (making a third pass through the FFP cavity) and exits thought fiber 16.

FIGS. 3A and 3C illustrate the use of glass sheaths 35 to vary the outside diameter of ferrules. This method can be used to adapt a given ferrule to a larger sized ferrule alignment fixture, for example. The passageway size in a ferrule alignment fixture may be dictated by the size of cylindrical PZTs that are available. This size may be too large for a given ferrule size. The sheath is bonded (preferably using UV-cured epoxy) to the outside circumference of the ferrule effectively increasing the outside diameter of the ferrule. The material of the sheath, its length and its points of bonding to the ferrule may be varied to achieve passive temperature compensation of an FFP. Temperature compensation of FFP filters has been discussed in the prior art patents noted above. Further, there are commercial sources of multiple fiber ferrules (ferrules having two, three and four fibers in various shapes of axial bore are all believed to be commercially available) or these ferrules can be readily made employing techniques well known in the art.

FIGS. 3B, 3D–3G all illustrate various multiple-fiber ferrule structures with ferrules having multiple fibers in rectangular, oval, triangular, round and square-shaped bores 21a–e, respectively. These figures illustrate the internal end face (3) of ferrule 5 and illustrate the positioning of the end face mirror (2) to cover the fiber ends 16, 17a18a or 19.

Figure 4A:
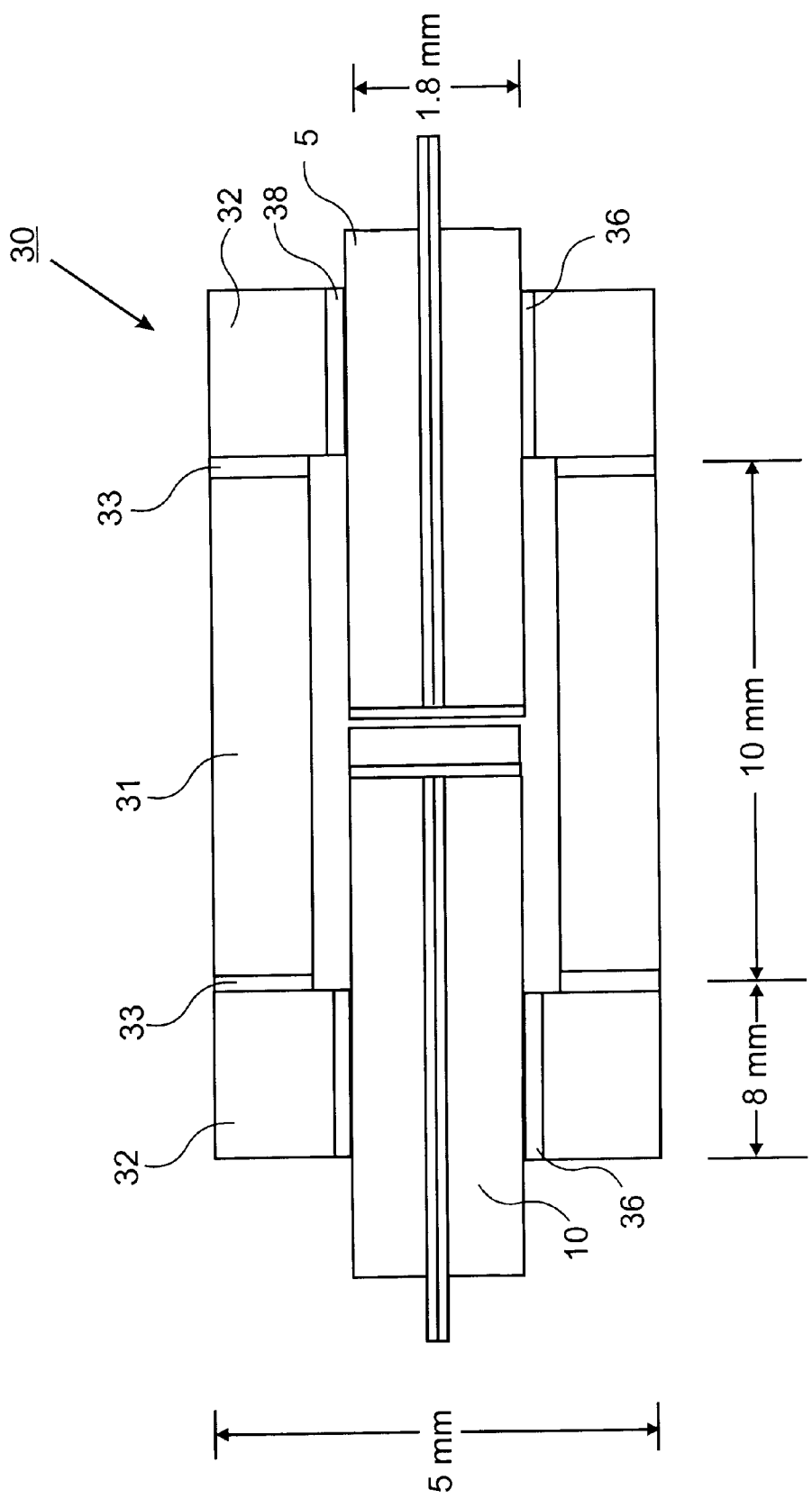
FIGS. 4A and 4B schematically illustrate cross-sectional views of alternative multiple fiber FP filters having a ferrule assembly within an alignment fixture with an intervening piezoelectric element for air gap tuning of the optical cavity of the filter.
Figure 4B:
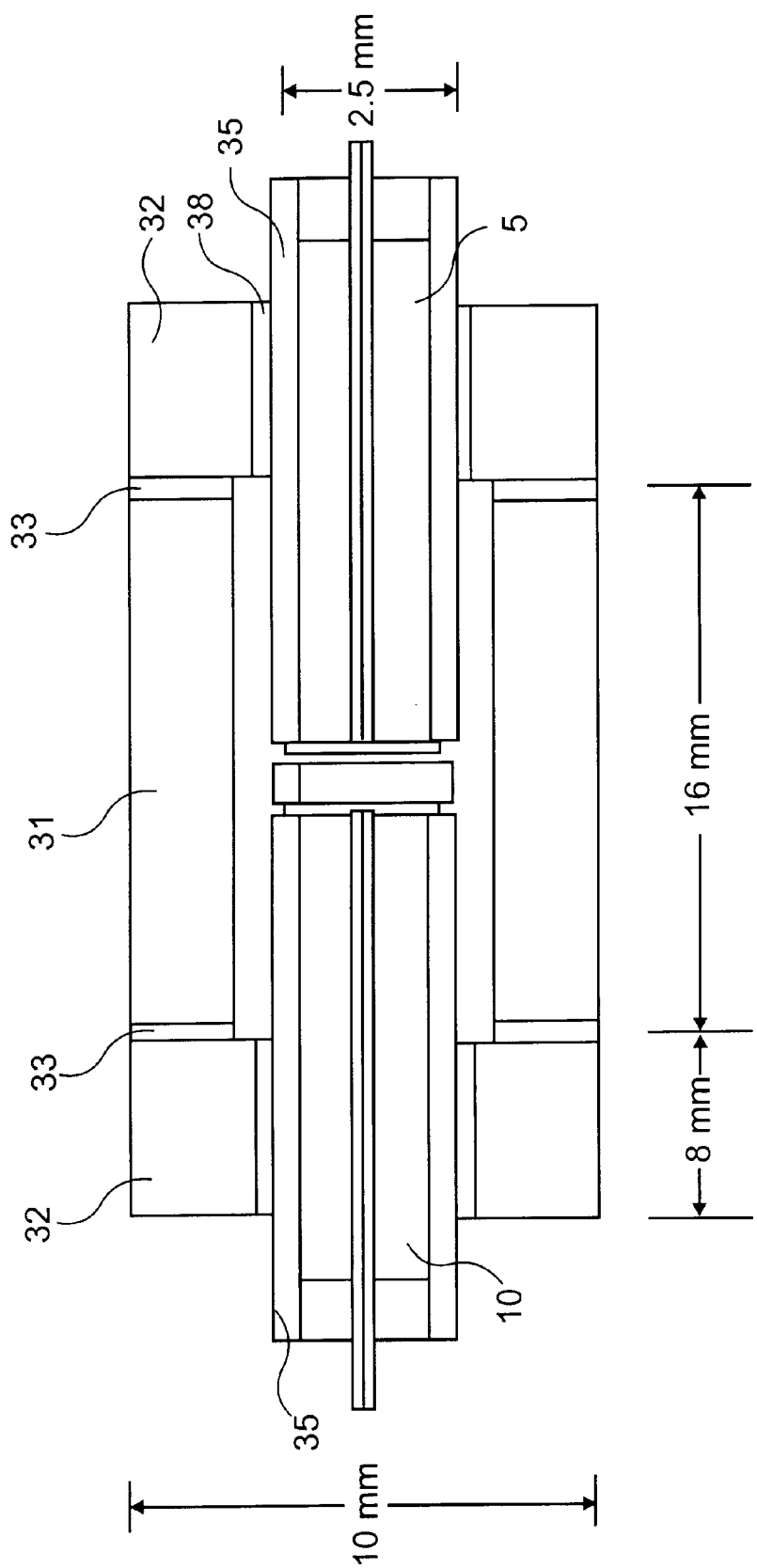

FIGS. 4A and 4B illustrate alternate FFP configurations 30 in which a dual fiber ferrule assembly is aligned within a ferrule alignment fixture. The device is illustrated in cross-section in FIGS. 4A and B and a perspective view is given in FIG. 5. The ferrule alignment fixture is composed of a cylindrical PZT 31 with two glass ferrule attachment rings 32. The PZT and the two glass rings are aligned using an appropriately dimensioned metal alignment rod and a glass ring is bonded to either end of the PZT as illustrated. The rings and PZT are bonded using epoxy or equivalent bonding material (preferably thermally-cured epoxy), e.g., bonds 33. The bonded fixture has a passageway 36 for receiving ferrules of the ferrule assembly. The FFPs of FIG. 4A and B are formed by initial alignment of the ferrule elements using a six axis alignment stage (Nano-Block stage Melles Griot, Boulder CO) once desired alignment is achieved the ferrules are removed from the stage and inserted into the passageway of the fixture. The ferrules are returned to the stage, and realigned using the six axis adjustments of the stage. The aligned ferrule assembly is then bonded into the fixture by introducing UV-cured epoxy into the passageway to bond 38 the ferrule outside circumference to the passageway of the ring. On UV curing, an aligned FFP is produced. These FFPs can be wavelength tuned by application of a voltage to the PZT to change its length.

The FFP of FIG. 4B differs from that of 4A in that a glass sheath 35 is used to increase the outside diameter of the ferrule. As noted above, the material and bonding of the sheath may be adjusted to achieve temperature compensation of the FFP.

In epoxy bonding of ferrules and ferrule alignment fixtures it is preferred that the thickness of the bonds are controlled and uniform.

Figure 5:
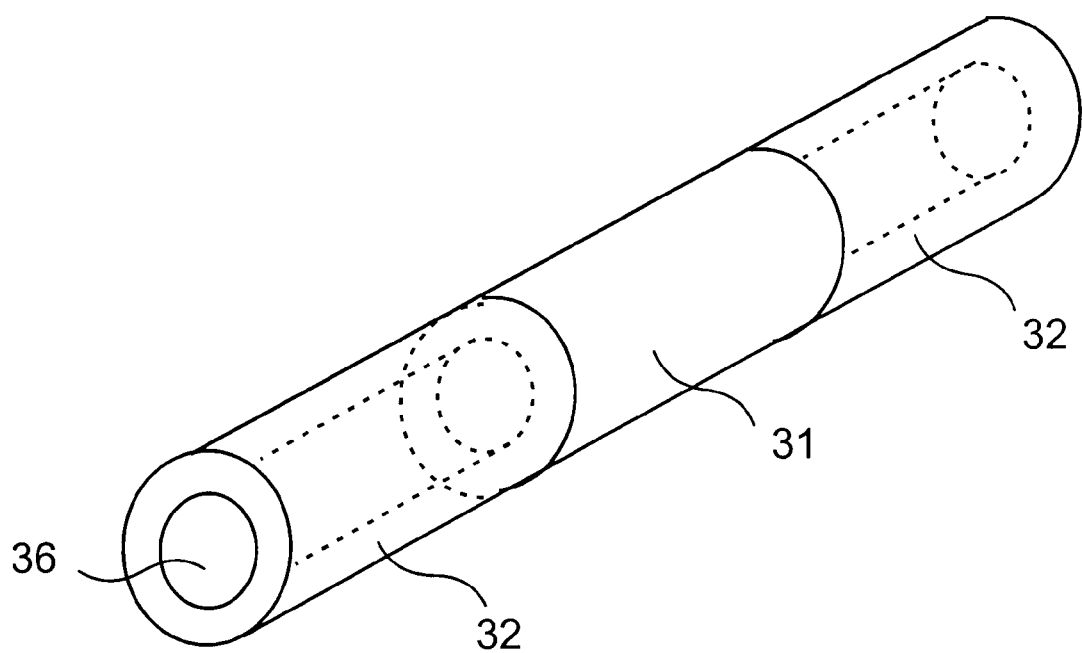
FIG. 5 is a perspective view of the tunable ferrule alignment fixture of FIGS. 4A and 4B having glass rings for ferrule attachment.

FIG. 5 is a perspective view of the FFP alignment fixture of FIGS. 4A and 4B. The figure illustrates the cylindrical PZT 31 bonded to the glass ferrule attachment rings 32. Ferrules are inserted into the passageway 36. The fixture of FIG. 5 is illustrated with a ferrule attachment ring that has a uniform bore along its axis. The ferrule may be bonded to the ring along the entire length of the ring passage or along a portion of the passage. The bond is preferably symmetric around the ferrule circumference. The length of the bonded region can be adjusted to temperature compensate the filter.

Figure 6A:
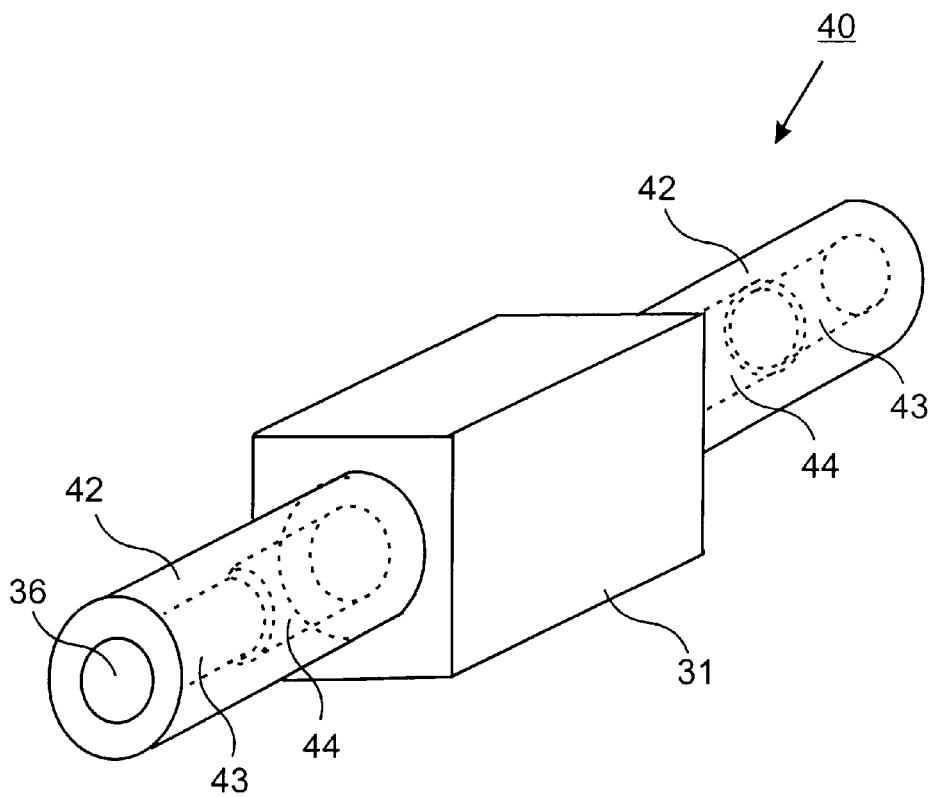
FIG. 6A is a perspective view of an alternative tunable ferrule alignment fixture with alternative ferrule attachment rings.
Figure 6B:
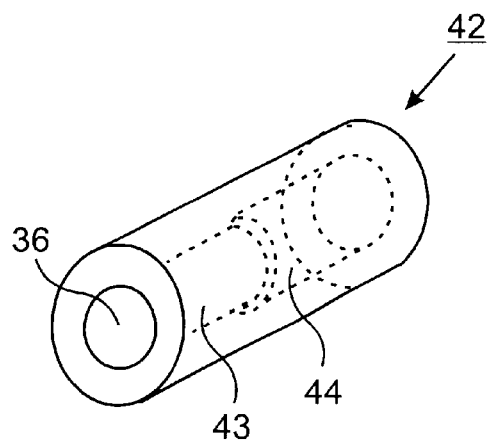
FIG. 6B is a perspective view of a ferrule attachment ring of the fixture of FIG. 6A.
Figure 6C:
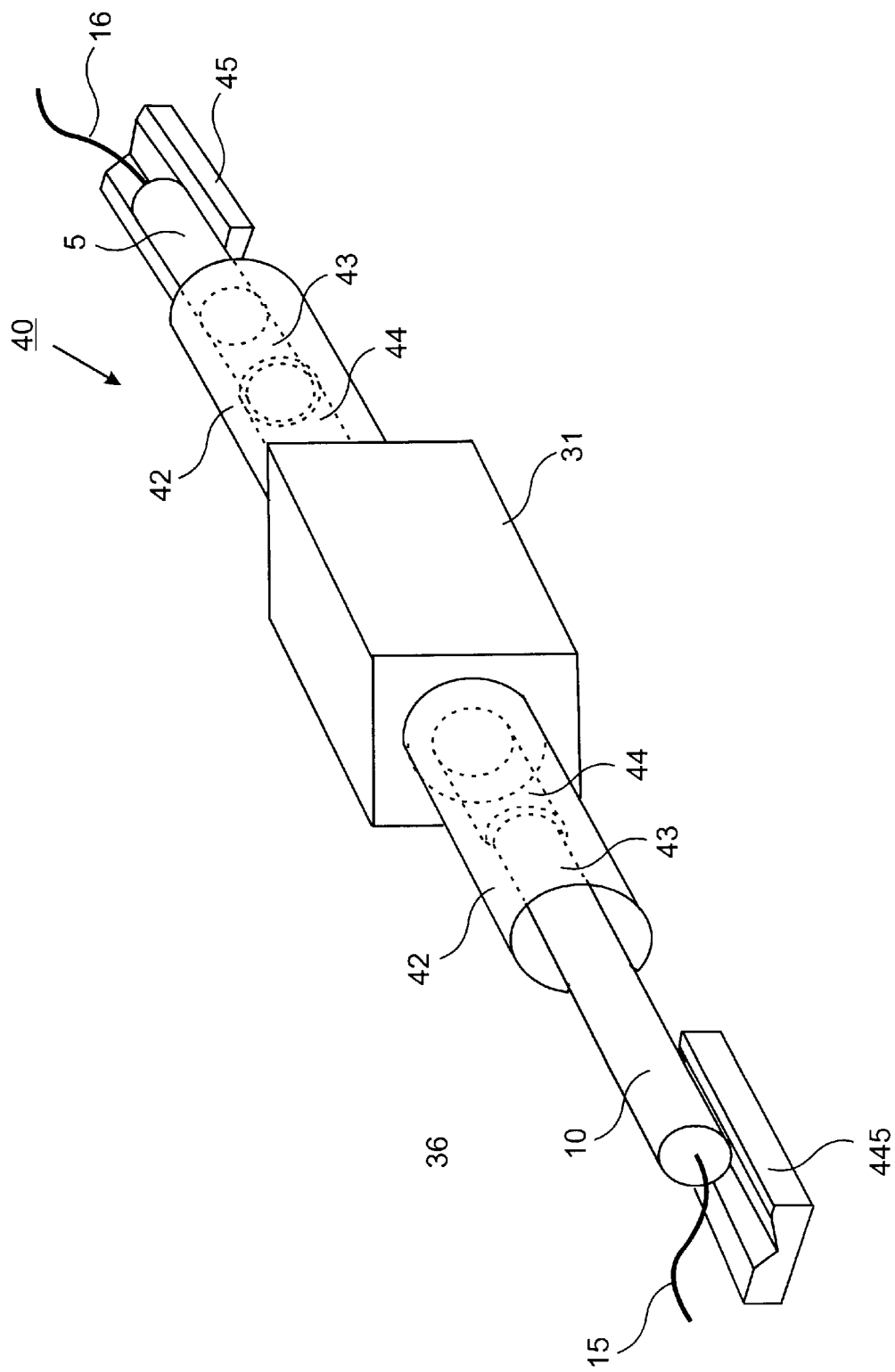
FIG. 6C illustrates the alignment of fibers in the ferrule assembly using a v-groove alignment stage which is adjustable in the x, y and z directions (as indicated) and adjustable by three angles θ, φ, and γ. Ferrules are inserted into, but not bonded to, the ferrule attachment rings of the alignment fixture. The ferrules are inserted and supported in the v-grooves of the alignment stage. The air gap (d) between the ferrule internal end faces is set by adjustment in the z direction and the optical fibers of the two ferrules are aligned by varying x, y directions and angles (if necessary) to maximized desired optical signal (e.g., intensity at a selected wavelength). Once the fibers are aligned the ferrules are bonded to the ferrule attachment rings such that the alignment is maintained in the bonded FFP filter. The ferrule alignment fixture and alignment method illustrated in FIG. 6A–C can be employed with single strand fiber ferrule assemblies, as well as with the multiple strand fiber ferrule assemblies described herein.

FIGS. 6A–6C illustrate an alternative ferrule alignment fixture useful for making multiple fiber FFPs of this invention. FIG. 6A is a perspective view of a ferrule alignment fixture 40 for use in a tunable FFP. Here two ferrule attachment rings 42 are bonded to a rectangular PZT 31 (a cylindrical PZT may also be used). Bonding of the fixture is done as described for the fixtures of FIGS. 4A and 4B and ferrules are inserted into passageway 36, realigned and the ferrules are bonded to the rings as described above. The ferrule attachment rings of this figure have a non-uniform bore which is sized to closely receive a ferrule at its external end (bore 43) and has a wider bore toward its internal end (44). The relative lengths of the different sized bores 43 and 44 can be varied to change the length of the bond to the ferrule and to change the distance of that bond from the end of the PZT. Variation of this length and bonding region can be used to temperature compensate an FFP.

FIG. 6B illustrates the ferrule attachment ring 42 in more detail. The ring will be bonded to the ferrule along the smaller sized bore 43. The ferrule will not be bonded to the ring along the larger bore 44. FIG. 6C illustrates the positioning of the ferrules after insertion into the fixture (without bonding) and the insertion of the ferrule ends into the alignment stage v-grooves (45). After initial adjustment of z to adjust the desired air gap, the fibers are aligned by moving the ferrules with respect to each other along the remaining 5 axes of the stage. Once the ferrules are aligned to maximize a desired signal output, a UV epoxy bond is formed between each ferrule and one of the attachment rings to lock the alignment. FIG. 6C illustrates the 17A/17B fiber loop to form the cascaded FFP filter.

Low shrinkage epoxy that does not substantially effect alignment on curing is preferred. To obtain the precise alignment important for multiple fiber FFPs ferrules and fixture components should be precisely machined preferably to 1/10,000th of an inch.

Initial attempts to prepare a dual-fiber FFP with useful tuning range were not successful. In early attempts a three axis (XYZ) alignment stage was used to align the fibers in the ferrules. It was found that angular control was important to obtain fiber alignment in multiple-fiber ferrule assemblies. Using such a stage the two resonance peaks through the different optical paths could not be aligned in the same voltage position.

When a six-axis stage was tried (including angular adjustment), it was found that the two resonance peaks could be aligned at a given wavelength. However, the aligned peaks soon became offset when the wavelength was tuned (i.e., the air gap was changed). Initially, it was assumed that the phase variation for wavelength-induced path length difference inside the two fiber waveguides was the main cause of the failure to maintain alignment. Based on standard optical calculations, it was believed that in order to obtain a path length difference of less than 1% of wavelength that the angular tolerance of the ferrule assembly alignment was required to be less than 0.007°. It was not believed that this tolerance was achievable in the fiber ferrule systems in which ferrule polishing angular tolerance is about 0.03°.

Figure 10:
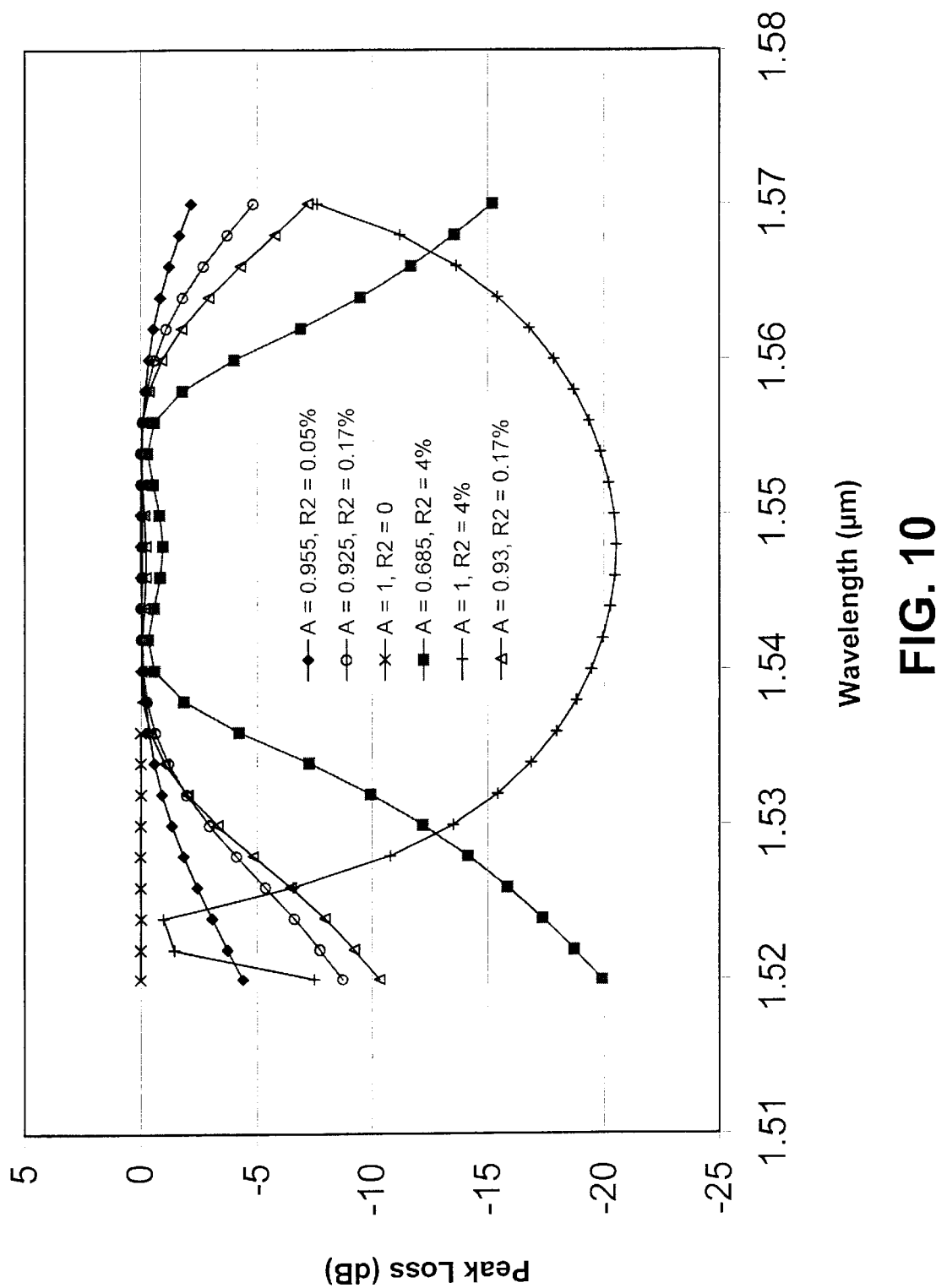
FIG. 10 presents the results of a calculation indicating that the weak reflection from the ferrule R2 end in the ferrule assembly of a multiple fiber FFP results in strong wavelength dependence of signal alignment from the filter. This calculation suggested that the use of index matching fluid or AR coatings might improve the tuning range of a multiple fiber FFP.

It was subsequently discovered, however, that the weak reflection at the glass-air interface inside the cavity formed in the ferrule assembly was the cause of the alignment offset with wavelength. It was then found by calculations as illustrated in FIG. 10 that it was theoretically possible to construct a dual-fiber FFP which would tune over about 30 nm without significant loss and/or bandwidth degradation, if the weak reflection could be suppressed anti-reflective using, for example, an index matching fluid in the air gap or by using AR coatings.

In practice when an index matching fluid was employed in the dual-fiber ferrule system, the wavelength tuning range of the FFP increased dramatically to over 50 nm to allow construction of a useful cascaded FFP. The peak of this cascaded FFP filter varied less than 1 dB over this tuning range.

In more detail, the multiple-fiber ferrule assemblies of this invention can be constructed as follows:

The multiple fiber ferrules which include AR coating at the wafer end face or which include an index matching fluid are aligned at a selected wavelength using a six axis alignment stage. The wavelength of the FFP (the z distance) is varied to examine the wavelength dependence of alignment. It may be that for the particular set of ferrules used that there is a stronger or weaker wavelength dependence of alignment. A central wavelength for tuning is then selected based on this examination of wavelength dependence. The central wavelength is positioned in a region of weak wavelength dependence. Thereafter, the ferrule assembly is realigned at the selected central wavelength. The ferrules are removed from the stage and inserted into the passageway of a selected alignment fixture. The ferrule ends are reintroduced into the v-grooves of the alignment stage and realigned. The ferrules are then bonded to the ferrule attachment rings or elements to lock in the alignment.

Figure 7:
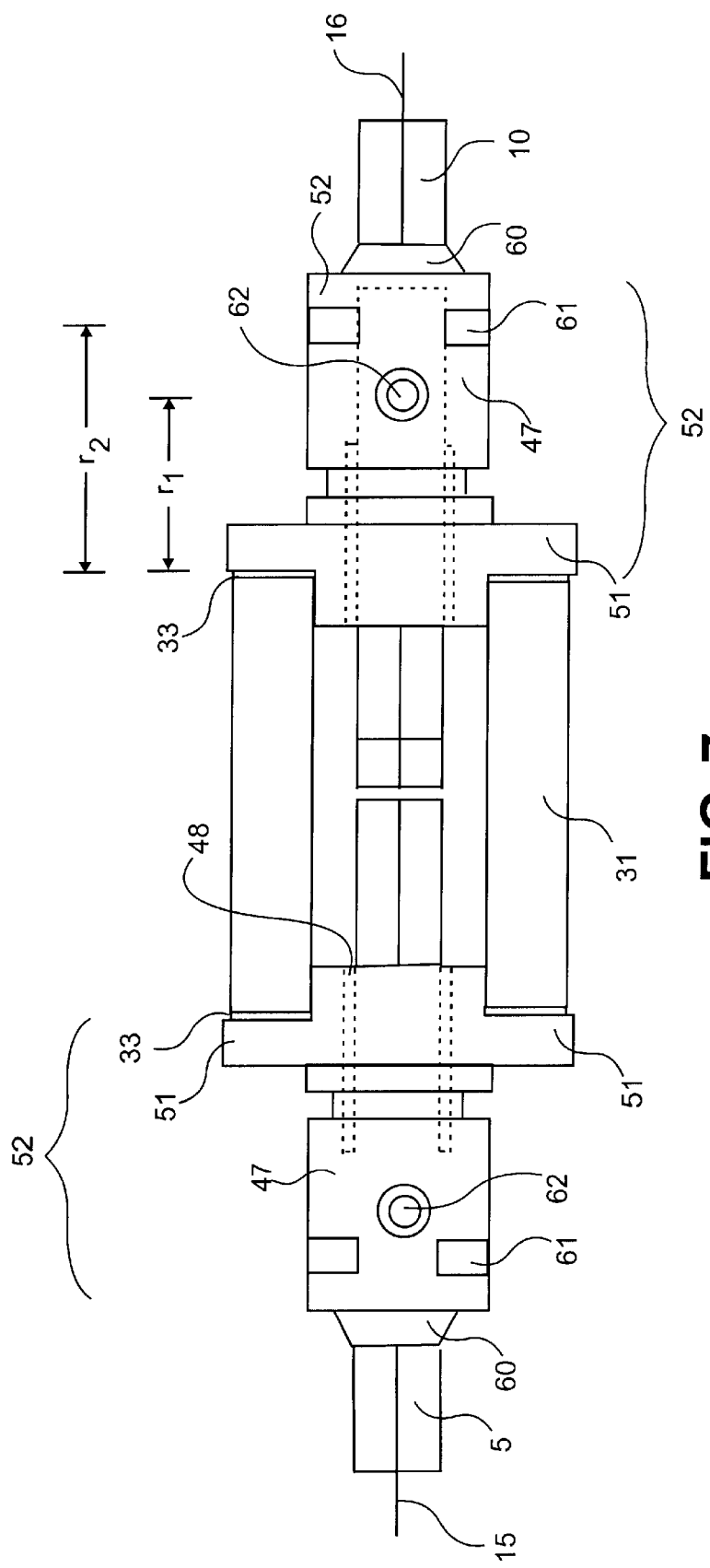
FIG. 7 schematically illustrates in cross-section an alternative tunable ferrule alignment fixture with ferrule assembly bonded to the fixture to form a tunable FFP. The fixture is illustrated with metal ferrule attachment rings bonded to a piezoelectric element (PZT). The metal ferrule attachment rings are bonded (after fiber alignment) to the ferrules using solder. The ferrules may be metal or metal-coated glass to facilitate solder bonding. The distances (r1 and/or r2) between the end of the PZT and the solder bonding points to the ferrules can be varied to adjust temperature compensation of the filter.

FIG. 7 is an alternative ferrule alignment fixture for use with the multiple fiber FFPs of this invention and in general for use in any FFP. The fixture employs metal cylindrical ferrule attachment elements 52 that are bonded to the ferrules using solder bonds 60, 61 and 62. The construction of the FFP of FIG. 7 is illustrated in FIGS. 8A–D.

The procedure for assembly of the tunable FFP of FIG. 7 is illustrated by FIGS. 8A–8D. The alignment fixture 50 is assembled by bonding two metal ferrule attachment elements 52 to opposite ends of a cylindrical piezoelectric transducer 31. The ferrule attachment elements 52 each have an axial passageway (48) for receiving a ferrule, a flange portion 51at one end, sized for bonding with the cylindrical PZT, and a cylindrical ferrule bonding portion 47 having several holes (53 and 54 extending through the cylinder wall into the passageway) to allow formation of a solder bond to a ferrule positioned within the passageway. The solder holes are preferably positioned in opposed pairs (53 or 54) along the length of the cylinder portion. The length of the ferrule attachment element can be varied to allow temperature compensation of the FFP. More specifically, the lengths r1 and/or r2 (the distance between the end of the PZT and the first solder joint) 62 can be varied for temperature compensation.

The ferrules attachment elements (52) are bonded to the ends of the PZT 31 by aligning the elements and the PZT by inserting a metal alignment rod through the passageway of each element and the passageway of the PZT, fitting the flange portion into the PZT and forming epoxy bonds 33 between the PZT ends and the flanges. Thermal cured epoxy is preferred for forming these bonds.

Figure 8A:
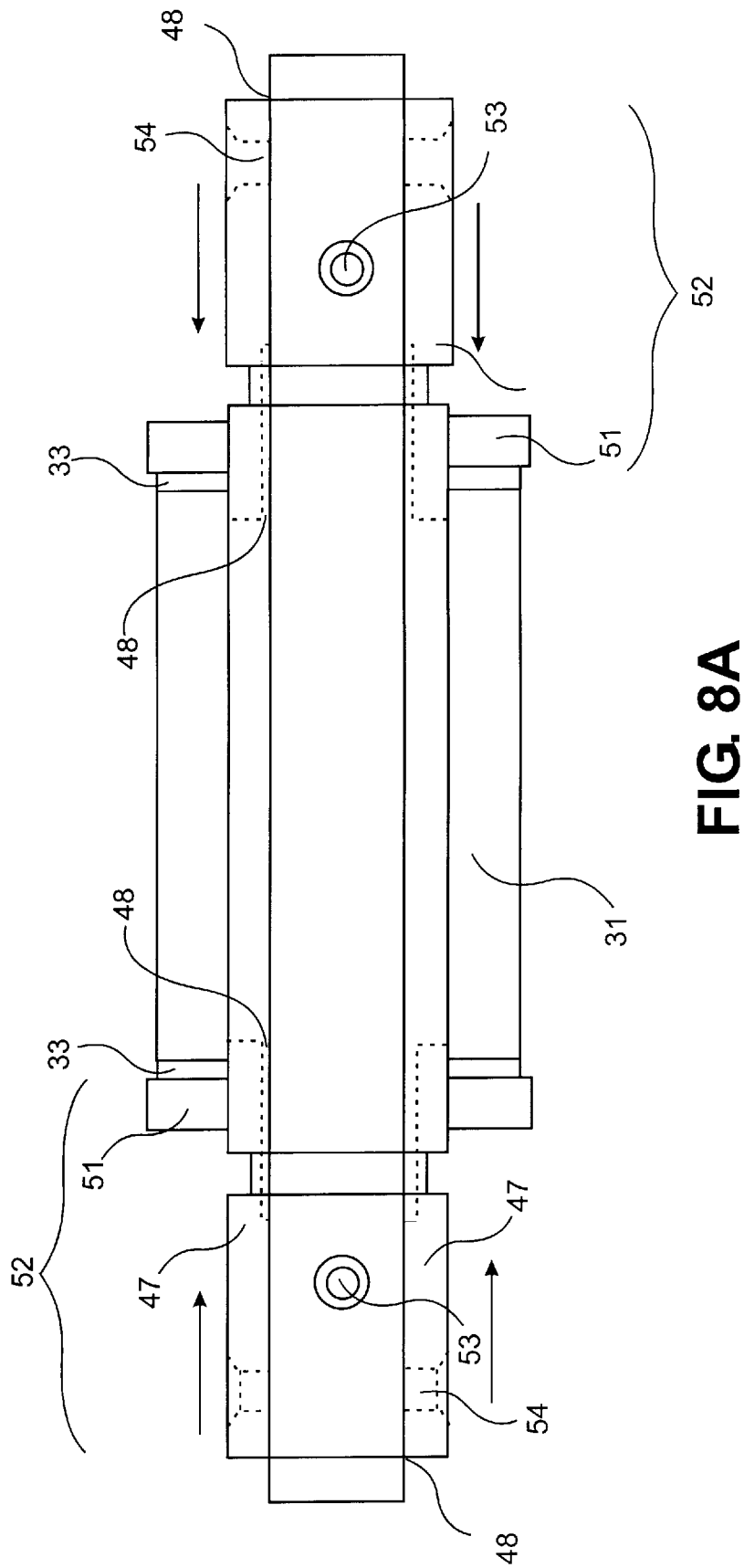
Figure 8D:
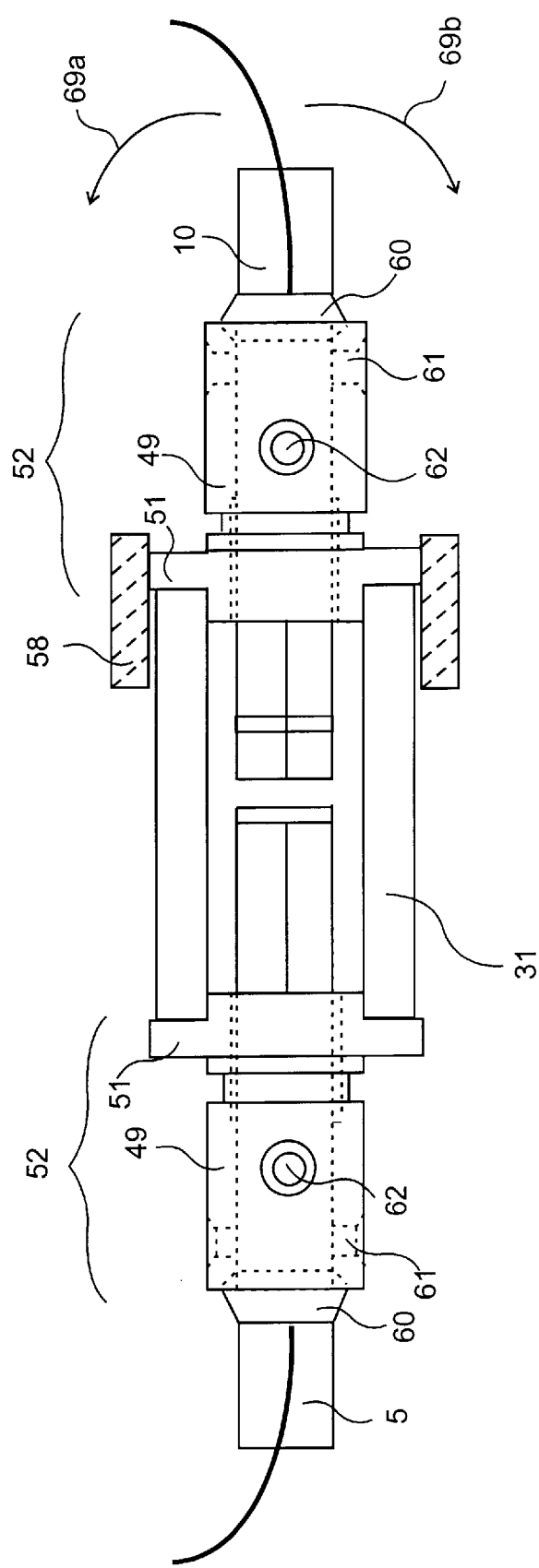
Figure 9:
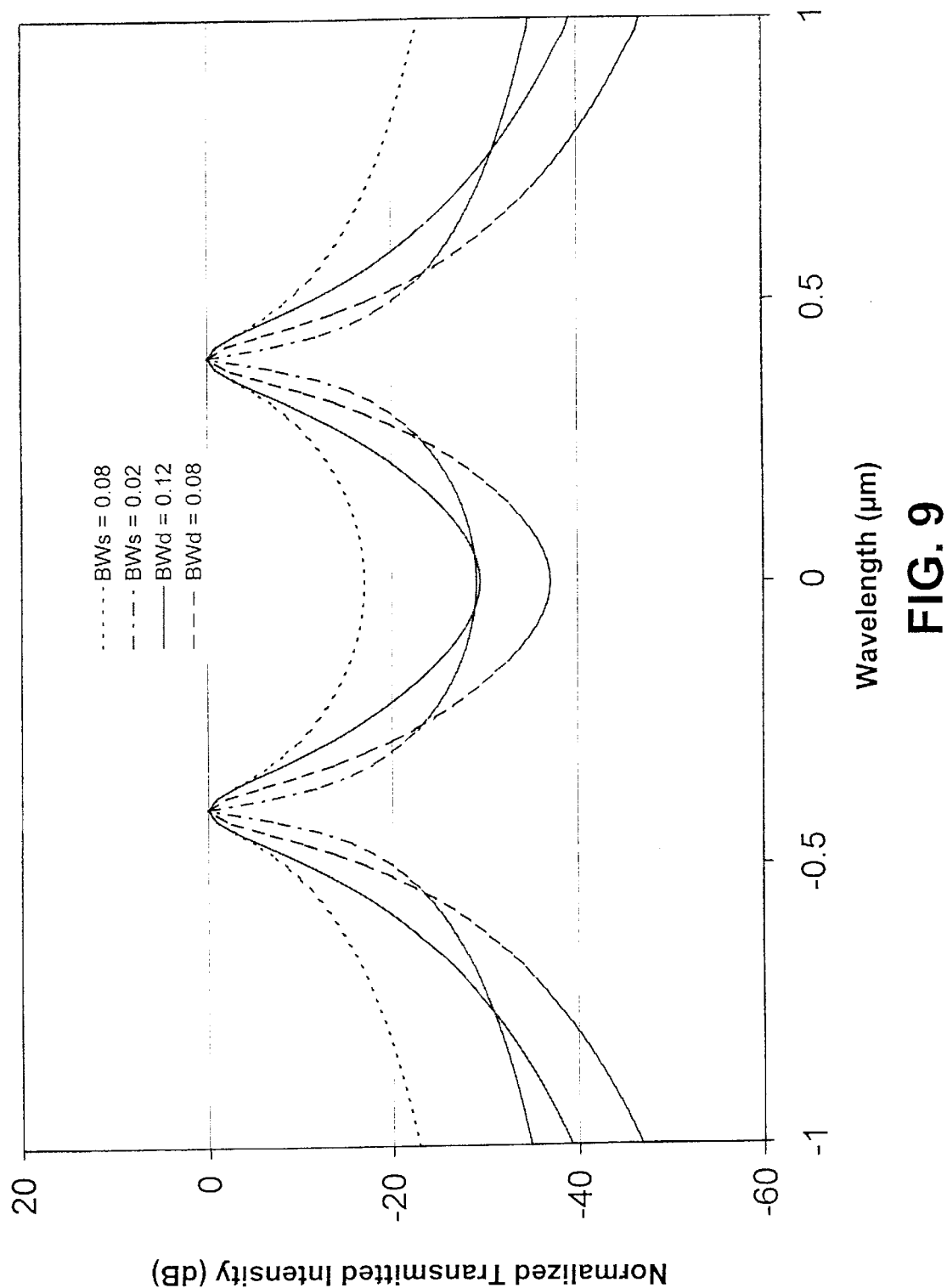
FIG. 9 are calculated spectra indicating the advantages of the use of two cascaded FFP filters. The figure compares single path configurations using either a 0.08 nm BW filter . . . or a 0.02 nm BW filter -·-·-to double path (cascaded filters) configurations of either a 0.125 nm B—filter or a 0.08 nm BW filter---. The double path configurations provide significantly improved peak separation.

The components of a fiber ferrule assembly are positioned in the v-grooves 45 of an alignment stage (a six dimensional alignment stage being preferred), a selected air gap 6 between the ferrule ends is set and the relative positions of the ferrules are adjusted to align the fiber (or fibers) in the ferrules. The fiber ferrule assembly comprises an FFP cavity, formed, for example, by opposing the internal ends of a mirror-ended fiber ferrule and an embedded-mirror wafered ferrule to form the optical cavity (1). The ferrules are then inserted into the ends of the bonded fixture and the ferrules are returned to the alignment stage and realigned. Once the fibers are aligned solder 65 (from soldering tip 66) is introduced into a side hole (53) and a top hole (54) of the cylinder portion of the ferrule attachment element. The FFP is then removed from the alignment stage and the remaining holes are filled with solder to form additional bonds to the ferrule in the fixture. In addition, a solder seal 60 is formed at the outside interface between the ferrule attachment element and the ferrule. Any angular misalignment caused by the soldering process can be adjusted mechanically as illustrated in FIG. 8D by placing a clamp 58 across the flange end of the ferrule attachment element 52 and mechanically adjusting the desired angle or other dimension 69a or 69b. The alignment can be stabilized or improved by a temperature annealing process. The FFP is placed in an oven at a temperature of about 85° C. for about 24 h and thereafter the FFP is temperature cycled from about–40° C. to about 85° C. for another 24 h to release the tension of the solder. The alignment of the FFP is hen readjusted. The temperature aging cycle is repeated until the alignment does not change. The alignment typically becomes stable after 2 to 4 cycles.

The cascaded fiber Fabry-Perot filters of this invention can be employed as components of a variety of optical devices and systems. The ferrule alignment fixtures disclosed herein are generally useful in constructing FFPs, and are particularly useful in construction of multiple fiber FFPs.

Those of ordinary skill in the art will appreciate that materials, procedure and techniques other than those specifically described herein can be employed in the practice of this invention without departing from its spirit and scope. All art-recognized alternatives and functional equivalents of materials, methods and techniques used or described herein are encompassed by this invention.

We claim:

1. A cascaded fiber Fabry-Perot filter which comprises:
    an axially aligned ferrule assembly having one or more ferrule elements therein with each ferrule element having an axial bore for receiving optical fiber;
    a plurality of optical fibers fixed within the axial bores of the ferrule elements of the ferrule assembly;
    a Fabry-Perot cavity formed in the ferrule assembly between two mirrors transverse to the axial bores of the ferrule elements and the optical fiber therein;
    wherein the plurality of optical fibers fixed within the axial bores of the ferrules are optical coupled to form a unidirectional optically continuous fiber path through the ferrule assembly making a plurality of traversals of the Fabry-Perot cavity.

2. The cascaded fiber Fabry-Perot filter of claim 1 which comprises:
    an axially aligned ferrule assembly having a first and a second ferrule element therein each with an axial bore for receiving optical fiber, the axially aligned assembly having an input end and an output end;
    a Fabry-Perot cavity formed in the optical path by mirrors within the ferrule assembly which are transverse to the axial bores of the ferrules and the optical fibers therein; and
    a plurality of optical fibers each having input and output ends and fixed within the axial bore of each ferrule element, the output end of each optical fiber of the first ferrule element aligned with the input end of an optical fiber of the second ferrule element to form a plurality of optically continuous fibers through the ferrule assembly; one of the optical fiber input ends of the first ferrule optically coupled to a light source and one of the optical fiber output ends of the second ferrule optically coupled for exit from the ferrule assembly, the remaining optical fiber output ends of the second ferrule optically coupled to the remaining optical fiber input ends of the first ferrule such that an optically continuous optical path is formed by the plurality of aligned and optically coupled optical fibers of the ferrule assembly from the light source input, making a plurality of traverses through the ferrule assembly to the output exit from the ferrule assembly such that the optical path makes a plurality of traverses of the Fabry-Perot cavity formed in the ferrule assembly.

3. A tunable cascaded fiber Fabry-Perot filter of claim 2 which further comprises:
    a ferrule holder for alignment of the ferrule assembly wherein the holder comprises a cylindrical piezoelectric transducer element having an axial passageway there through of sufficient diameter to receive a ferrule and having two end faces perpendicular to the passageway; a first and a second cylindrical ferrule attachment ring having an axial passageway for closely receiving a ferrule and each having two end faces perpendicular to the passageway, the passageways of the two rings and the transducer element axially aligned and one end face of one ring fixed to one end face of the transducer and one end face of the second ring fixed to the other end face of the transducer;
    wherein one of the first or second ferrule elements is inserted and fixedly attached into one of the ferrule attachment rings of the holder and the other of the first or second ferrule elements is inserted and fixedly attached into the other of the ferrule attachment rings such that the internal end faces of the ferrules are opposed with a gap between the ferrule end faces and the optical fibers in the ferrules are aligned.

4. A tunable cascaded filter of claim 3 further comprising a voltage source for application of a voltage to the piezoelectric transducer to change its length.

5. The tunable cascaded filter of claim 3 wherein the ferrule attachment rings are glass.

6. The tunable cascaded filter of claim 3 wherein the ferrule attachment rings are metal.

7. The tunable cascaded filter of claim 6 wherein the metal ferrule attachment rings are provided with one or more holes extending from the cylindrical surface into the axial passageway of the ring for receiving solder to bond an inserted ferrule to the ferrule attachment ring.

8. The tunable cascaded filter of claim 7 wherein a plurality of solder holes are provided around the circumference of the ring and at different axial distances from the end face that is fixed to the piezoelectric transducer.

9. The tunable cascaded filter of claim 3 wherein the ferrule attachment rings further comprise a flange at one end face surrounding the axial passageway of the ring for insertion into the passageway of the piezoelectric transducer on bonding of that ring end face to an end face of the transducer.

10. A method of tuning the wavelengths of light transmitted by the cascaded Fabry-Perot filter of claim 3, said method comprising:

a) shining light from an optical source on to an optical fiber input end of an optical fiber fixed within the axial bore of said first ferrule element;

b) passing said light through said unidirectional optically continuous fiber path through the ferrule assembly, wherein said light makes a plurality of traversals through said Fabry-Perot cavity formed within the axial bore of said cylindrical piezoelectric transducer element between said two mirrors transverse to the axial bores of said first and second ferrule elements and separated by a first optical cavity path length, whereby light of a first wavelength distribution is transmitted through said cascaded Fabry-Perot filter;

c) applying a voltage to said piezoelectric transducer element, whereby the length of said piezoelectric transducer element is changed to achieve a second optical cavity path length different from said first optical path length, whereby light of a second wavelength distribution different from said first wavelength distribution is transmitted through said cascaded Fabry-Perot filter.

11. A cascaded Fabry-Perot filter of claim 1 in which the ferrule assembly comprises:

a first fiber optical ferrule comprising:
a substantially cylindrical element having an internal and an external end face, an axial bore there through for receiving optical fiber, and having a plurality of optical fibers fixed within the axial bore of the ferrule element each of which optical fibers has an optical fiber end at the internal end face of the ferrule element and wherein the optical fibers exit the external end of the ferrule element; and
a mirror at the internal end face of the ferrule element transverse to the axial bore at the optical fiber ends;

a second optical fiber ferrule comprising:
a substantially cylindrical element having an internal and an external end face and an axial bore there through for receiving optical fiber and having a plurality of optical fibers fixed within the axial bore of the ferrule element each of which optical fibers has an optical fiber end at the internal end face of the ferrule element and wherein the optical fiber exits the external end of the ferrule element; and
a mirror at the internal end face of the ferrule element transverse to the axial bore at the optical fiber ends;
a substantially cylindrical wafer element having an internal and an external end face and an axial bore there through for receiving optical fiber, and having a plurality of optical fibers fixed within the axial bore of the wafer element each of which optical fibers has an optical fiber end at both the internal end face and the external end face of the wafer element; wherein each of the optical fiber ends at the internal end face of the ferrule element is aligned with an optical fiber end at the internal end face of the wafer element and the internal end face of the ferrule element is bonded to the external end face of the wafer element to form a wafered ferrule with embedded mirror;

wherein the mirrored internal end face of the first fiber ferrule and the internal end face of the wafer of the second fiber ferrules are opposed and aligned to so that each of the optical fiber ends of the internal end face of the first optical fiber ferrule are aligned with the optical fiber ends of the internal end face of the wafer element of the second optical fiber ferrule to form a Fabry-Perot cavity between the end face mirror and the embedded mirror and wherein each, except one, of the optical fibers exiting the external end face of the first ferrule is optically coupled to an optical fiber exiting the external end face of the second ferrule to form an optically continuous path that comprises multiple loops through the fibers of the first and second ferrule and multiple passes through the Fabry-Perot cavity formed in the aligned ferrules.

12. The cascaded Fabry-Perot filter of claim 11 wherein each ferrule element comprises 2, 3, or 4 optical fibers.

13. The cascaded Fabry-Perot filter of claim 11 further comprising a ferrule holder in which the ferrule assembly is aligned.

14. The cascaded Fabry-Perot filter of claim 11 wherein the ferrule assembly comprises a gap between the aligned first and second optical fiber ferrules and the filter is tuned by changing the length of the gap.

15. The cascaded Fabry-Perot filter of claim 14 further comprising a ferrule holder in which the ferrule assembly is aligned and which allows the length of the gap between the ferrules to be changed without significant misalignment.

16. The cascaded Fabry-Perot filter of claim 14 further comprising index matching fluid in the gap between the ferrules.

17. The cascaded Fabry-Perot filter of claim 14 further comprising an anti-reflective coating on the internal end face of the wafer element of the second optical fiber ferrule.

18. A method of tuning the wavelengths of light transmitted by the cascaded Fabry-Perot filter of claim 11, said method comprising:

a) shining light from an optical source on to an optical fiber input end of the optical fiber not optically coupled to an optical fiber exiting the external end face of the second fiber optic ferrule and fixed within the axial bore of the first fiber optic ferrule of said ferrule elements;

b) passing said light through said unidirectional optically continuous path through the ferrule assembly, wherein said light makes a plurality of traversals through said Fabry-Perot cavity between said end face mirror and said embedded mirror separated by a first optical cavity path length, whereby light of a first wavelength distribution is transmitted through said cascaded Fabry-Perot filter;

c) changing the distance separating said end face mirror and said embedded mirror to achieve a second optical cavity path length different from said first optical path length, whereby light of a second wavelength distribution different then said first wavelength distribution is transmitted through said cascaded Fabry-Perot filter.

19. A method of tuning the wavelengths of light transmitted by the cascaded Fabry-Perot filter of claim 11, said method comprising:

a) shining light from an optical source on to an optical fiber input end of the optical fiber not optically coupled to an optical fiber exiting the external end face of the second fiber optic ferrule and fixed within the axial bore of the first fiber optic ferrule of said ferrule elements;

b) passing said light through said unidirectional optically continuous path through the ferrule assembly, wherein said light makes a plurality of traversals through said Fabry-Perot cavity containing a fluid with a first refractive index, whereby light of a first wavelength distribution is transmitted through said cascaded Fabry-Perot filter;

c) changing the index of refraction of said fluid contained within said Fabry-Perot cavity to achieve a second refractive index different from said first refractive index, whereby light of a second wavelength distribution different from said first wavelength distribution is transmitted through said cascaded Fabry-Perot filter.

20. A method of changing the spectral bandwidth of light transmitted by the cascade Fabry-Perot filter of claim 11, said method comprising:

a) shining light from an optical source on to an optical fiber input end of the optical fiber not optically coupled to an optical fiber exiting the external end face of the second fiber optic ferrule and fixed within the axial bore of the first fiber optic ferrule of said ferrule elements;

b) passing said light through said unidirectional optically continuous fiber path through the ferrule assembly, wherein said light makes a first plurality of traversals through said Fabry-Perot cavity, whereby light possessing a first spectral bandwidth is transmitted, through said cascaded Fabry-Perot filter;

c) changing the number of optical fibers within the axial bores of said first and second ferrule elements of said ferrule assembly, whereby said light makes a second plurality of traversals through said Fabry -Perot cavity with a different number of passes through the Fabry-Perot cavity than said first plurality of traversals, whereby light possessing a second spectral bandwidth, different than said first spectral bandwidth, is transmitted through said cascaded Fabry-Perot filter.

21. The cascaded Fabry-Perot filter of claim 1 further comprising optical isolators in the optically continuous fiber path between traversals of the Fabry-Perot cavity.

22. The cascaded Fabry-Perot filter of claim 1 which is a dual cascaded filter having two optical fibers fixed within the axial bore of the ferrules.

23. The cascaded Fabry-Perot filter of claim 1 which comprises:

a ferrule assembly having a first and a second ferrule element each having an axial bore therein for receiving optical fiber;

a Fabry-Perot cavity formed within the ferrule assembly by at least two mirrors that are transverse to the optical fiber in the axial bore;

an input optical fiber fixed in the axial bore of the first ferrule for coupling to an external light source into the filter and an exiting optical fiber fixed in the axial bore of the second ferrule for coupling light out of the filter;

a unidirectional continuous optical fiber path comprising a plurality of optical fiber loops and having an input end optically coupled to the input optical fiber of the first ferrule and an output end optically coupled to the exiting optical fiber of the second ferrule, wherein portions of each optical fiber loop are fixed within the axial bores of the first ferrule and the second ferrule and each optical fiber loop passes through the Fabry-Perot cavity.

24. The cascaded Fabry-Perot filter of claim 23 wherein each loop of the continuous optical fiber path comprises an optical isolator.

25. The cascaded Fabry-Perot filter of claim 23 wherein one of the ferrule elements is a mirror-ended ferrule and the other of the ferrules is a wafered ferrule with embedded mirror and the Fabry-Perot cavity is formed between the mirrors of each ferrule.

26. The cascaded Fabry-Perot filter of claim 1 which is a fixed wavelength filter.

27. The cascaded Fabry-Perot filter of claim 1 which is a tunable wavelength filter.

28. An optical device comprising the cascaded Fabry-Perot filter of claim 1.

* * * * *

UNITED STATES PATENT AND TRADEMARK OFFICE
CERTIFICATE OF CORRECTION

PATENT NO.      : 6,241,397 B1
DATED           : June 5, 2001
INVENTOR(S)     : Bao et al.

It is certified that error appears in the above-identified patent and that said Letters Patent is hereby corrected as shown below:

Title page,
Item [57], ABSTRACT, please insert -- are -- between "assembly" and "traverse."

Column 1,
Line 39, please insert -- now -- between "08/897,474;" and U.S. Pat. No.".
Line 40, after "08/805,461" please insert -- now U.S. Pat. No. 6,137,812 --.
Line 41, after "08/833,602" please insert -- now --.

Column 2,
Line 1, please replace "applications" with -- application --.
Line 9, please replace "used" with -- use --.

Column 3,
Line 57, please replace "(2-4)" with -- (2-4) --.

Column 4,
Line 14, please replace "maximized" with -- maximize --.
Line 19, please replace "FIG. 6A-C" with FIGS. 6A-C --.
Line 33, please replace "illustrates" with -- illustrate --.
Line 57, please replace "..." with -- (⋯) --.
Line 57, please replace "-⋅-⋅-" with -- (-⋅-⋅-) --.
Line 58, please replace "B(—)" with -- BW(—) --.
Line 59, please replace "filter---" with -- filter(---) --.

Column 5,
Line 1, please replace "0.005%" with -- 0.05% --.
Line 2, please insert -- (-x-) -- between "0.17%;" and "is A=1."
Line 23, please replace "effect" with -- affect --.
Line 35, please replace "individual" with -- individually --.
Line 50, please replace "maximized" with -- maximize --.

Column 6,
Line 14, please replace "thought" with -- through --.

Column 7,
Line 44, please replace "5" with -- 5 --.
Line 49, please replace "effect" with -- affect --.

UNITED STATES PATENT AND TRADEMARK OFFICE
CERTIFICATE OF CORRECTION

PATENT NO. : 6,241,397 B1
DATED : June 5, 2001
INVENTOR(S) : Bao et al.

It is certified that error appears in the above-identified patent and that said Letters Patent is hereby corrected as shown below:

Column 8,
Line 15, please delete "anti-reflective".
Line 17, please insert -- anti-reflective -- between "using" and "AR".

Column 9,
Line 36, please replace "hen" with -- then --.
Line 47, please replace "procedure" with -- procedures --.
Line 64, after "ferrules are" please replace "optical" with -- optically --.

Column 12,
Line 5, please replace "ferrules" with -- ferrule -- and delete "to".
Line 60, after "different" please replace "then" with -- than --.

Column 13,
Line 31, please delete "," following "transmitted".

Signed and Sealed this

Twelfth Day of November, 2002

*Attest:*

*Attesting Officer*

JAMES E. ROGAN
*Director of the United States Patent and Trademark Office*